(12) United States Patent
Hsu et al.

(10) Patent No.: US 9,007,701 B2
(45) Date of Patent: Apr. 14, 2015

(54) OPTICAL LENS ASSEMBLY FOR IMAGE PICKUP

(75) Inventors: Chih-Wen Hsu, Taichung (TW); Ming-Ta Chou, Taichung (TW)

(73) Assignee: Largan Precision Co., Taichung (TW)

( * ) Notice: Subject to any disclaimer, the term of this patent is extended or adjusted under 35 U.S.C. 154(b) by 510 days.

(21) Appl. No.: 13/414,303

(22) Filed: Mar. 7, 2012

(65) Prior Publication Data

US 2013/0050849 A1 Feb. 28, 2013

(30) Foreign Application Priority Data

Aug. 22, 2011 (TW) .............................. 100130040 A

(51) Int. Cl.
*G02B 9/12* (2006.01)
*G02B 13/00* (2006.01)

(52) U.S. Cl.
CPC .............. *G02B 13/0035* (2013.01); *G02B 9/12* (2013.01)

(58) Field of Classification Search
CPC ............................... G02B 13/0035; G02B 9/12
USPC .................................................. 359/716, 784
See application file for complete search history.

(56) References Cited

U.S. PATENT DOCUMENTS

| 7,301,712 | B2 | 11/2007 | Kamo |
| 7,710,662 | B2 | 5/2010 | Nakanishi |
| 8,531,781 | B2 * | 9/2013 | Orihara et al. ................ 359/716 |
| 2009/0046380 | A1 | 2/2009 | Tang |

FOREIGN PATENT DOCUMENTS

| JP | H10-170819 A | 6/1998 |
| WO | WO 2011027622 A1 * | 3/2011 |

* cited by examiner

*Primary Examiner* — Zachary Wilkes
(74) *Attorney, Agent, or Firm* — Wang Law Firm, Inc.; Li K. Wang; Stephen Hsu

(57) ABSTRACT

An optical lens assembly for image pickup, sequentially arranged from an object side to an image side along the optical axis, comprising: the first lens element with negative refractive power has a convex object-side surface and a concave image-side surface; the second lens element with positive refractive power has bi-convex surfaces; and the third lens element with negative refractive power, made of plastic, and which has a convex object-side surface and a concave image-side surface with at least one thereof is aspheric. By such arrangements, the optical lens assembly for image pickup satisfies conditions related to shorten the total length and to reduce the sensitivity for use in compact cameras and mobile phones with camera functionalities.

19 Claims, 10 Drawing Sheets

OPTICAL LENS ASSEMBLY FOR IMAGE PICKUP

BACKGROUND OF THE INVENTION

1. Field of the Invention

The present invention relates to an optical lens assembly for image pickup, and more particularly to the optical lens assembly for image pickup to provide a good image quality to satisfy the specifications for electronic products.

2. Description of the Related Art

Compact electronic products such as digital still cameras and mobile phone cameras are generally equipped with an optical lens assembly for image pickup for capturing images of an object, and the optical lens assembly for image pickup tends to be developed with a compact design and a low-cost while achieving a good aberration correction capability, and providing high resolution and superior image quality.

In general, a conventional optical lens assembly for image pickup of a compact electronic product comes with different designs, including the two-lens, three-lens, four-lens, and five-or-more lens designs. Although the optical lens assembly for image pickup with the four-lens or five-lens designs has advantages on image aberration and modulation transfer function (MTF) performance, it comes with a high cost. The optical lens assembly for image pickup with the two-lens design usually cannot meet the high resolution requirement. Therefore, the optical lens assembly for image pickup with the three-lens design is usually taken into consideration as a first priority for the design.

In various compact designs of the three-lens optical lens assembly for image pickup having a fixed focal length, prior arts usually adopt a design with a combination of positive refractive power or negative refractive power, particularly the design of a first lens element closest to the image side having positive refractive power to increase the optical magnification of the optical lens assembly for image pickup, and prior arts usually adopt a design with bi-convex lens or a meniscus lens with a convex object-side surface as disclosed in U.S. Pat. No. 7,710,662 and U.S. Publication US2009/046380. Although the first lens element closest to the object side has stronger positive refractive power to provide a better light condensation, yet the aberration cannot be compensated or corrected by the second lens element and the third lens element easily. As a result, the high quality requirement of the optical lens assembly for image pickup cannot be achieved. To overcome this drawback, a concave object-side surface of the first lens element is adopted in the design as disclosed in U.S. Pat. No. 7,301,712, such that the positive refractive power of the first lens element will not be excessive, and a concave object-side surface of the second lens element is adopted in the design to achieve the effect of reducing the total length of the optical lens assembly for image pickup. However, the curvature of the second lens element encounters a large change, and thus incurring a difficult manufacture. In addition, the refractive power of the second lens element is higher than the refractive power of the first lens element; a chromatic aberration occurs at edges of the optical lens assembly for image pickup and a more serious aberration results.

To overcome the aforementioned drawbacks of the prior arts, a better design for compensating the aberration and limiting the total length of the optical lens assembly for image pickup is required for the use in compact electronic devices. Therefore, the present invention provides a more practical design and adopts a combination of different refractive powers and a combination of convex and concave optical surfaces for three lens elements to achieve the effects of improving the imaging quality, lowering the cost for mass production, and applying the design in electronic products.

SUMMARY OF THE INVENTION

Therefore, it is a primary object of the present invention to provide an optical lens assembly for image pickup, sequentially arranged from an object side to an image side along an optical axis, comprising: the first lens element, the second lens element and the third lens element, wherein the first lens element with negative refractive power has a convex object-side surface and a concave image-side surface; the second lens element with positive refractive power has both convex object-side surface and image-side surface; and the third lens element with negative refractive power is made of plastic and has a convex object-side surface and a concave image-side surface, and at least one of the object-side surface and image-side surface is aspheric. The optical lens assembly for image pickup further comprises a stop, and the following relations are satisfied:

$$0 < R_5 < R_3 \tag{1}$$

$$0.5 < S_D/T_D < 0.85 \tag{2}$$

Wherein, $R_3$ is the curvature radius of the object-side surface of the second lens element, $R_5$ is the curvature radius of the object-side surface of the third lens element $S_D$ is the axial distance between the stop and the image-side surface of the third lens element, and $T_D$ is the axial distance between the object-side surface of the first lens element and the image-side surface of the third lens element.

On the other hand, the present invention provides an optical lens assembly for image pickup as described above, wherein the first lens element and the second lens element are made of plastic; at least one of the object-side surface and image-side surface of the first lens element is aspheric; at least one of the object-side surface and image-side surface of the second lens element is aspheric; and the optical lens assembly for image pickup satisfies one or more of the following relations in addition to the relations (1) and (2):

$$-1.2 < f/f_1 < -0.3 \tag{3}$$

$$0.3 < (CT_1 + CT_3)/CT_2 < 0.78 \tag{4}$$

$$0.15 < T_{12}/CT_2 < 0.8 \tag{5}$$

$$-0.7 < R_4/f < 0 \tag{6}$$

$$-0.4 < R_4/f < 0 \tag{7}$$

$$0 < R_6/f < 0.5 \tag{8}$$

$$25 < v_2 - v_1 < 42 \tag{9}$$

$$-10 < v_2 - v_1 - v_3 < 20 \tag{10}$$

$$25 < HFOV < 38 \tag{11}$$

Wherein, f is the focal length of the optical lens assembly for image pickup, $f_1$ is the focal length of the first lens element, $CT_1$ is the central thickness of the first lens element, $CT_2$ is the central thickness of the second lens element, $CT_3$ is the central thickness of the third lens element, $T_{12}$ is the axial distance between the first lens element and the second lens element, $R_4$ is the curvature radius of the image-side surface of the second lens element, $R_6$ is the curvature radius of the image-side surface of the third lens element, $v_1$ is the Abbe number of the first lens element, and $v_2$ is the Abbe number of the second lens element, $v_3$ is the Abbe number of the third lens element, and HFOV is the half of maximum view angle of the optical lens assembly for image pickup.

Another objective of the present invention is to provide an optical lens assembly for image pickup, sequentially arranged from an object side to an image side along an optical axis, comprising: the first lens element, the second lens element and the third lens element; wherein the first lens element with negative refractive power has a convex object-side surface and a concave image-side surface; the second lens element with positive refractive power has both convex object-side surface and image-side surface; the third lens element with negative refractive power is made of plastic and has a convex object-side surface and a concave image-side surface, and at least one of the object-side surface and image-side surface is aspheric; and optical lens assembly for image pickup satisfies the following relations:

$$0<R_5<R_3 \quad (1)$$

$$-0.7<R_4/f<0 \quad (6)$$

Wherein, $R_3$ is the curvature radius of the object-side surface of the second lens element, $R_4$ is the curvature radius of the image-side surface of the second lens element, $R_5$ is the curvature radius of the object-side surface of the third lens element, and f is the focal length of the optical lens assembly for image pickup.

On the other hand, the present invention provides an optical lens assembly for image pickup as described above, wherein the optical lens assembly for image pickup satisfies one or more of the following relations in addition to the relations (1) and (6):

$$0.15<T_{12}/CT_2<0.8 \quad (5)$$

$$1.4<f/f_2<2.2 \quad (12)$$

$$0<R_6/f<0.5 \quad (8)$$

$$0.4<(CT_1+CT_3)/CT_2<0.78 \quad (13)$$

$$25<HFOV<38 \quad (11)$$

$$25<v_2-v_1<42 \quad (9)$$

Wherein, $T_{12}$ is the axial distance between the first lens element and the second lens element, $CT_1$ is the central thickness of the first lens element, $CT_2$ is the central thickness of the second lens element, $CT_3$ is the central thickness of the third lens element, f is the focal length of the optical lens assembly for image pickup, $f_2$ is the focal length of the second lens element, $R_6$ is the curvature radius of the image-side surface of the third lens element, HFOV is the half of maximum view angle of the optical lens assembly for image pickup, $v_1$ is the Abbe number of the first lens element, and $v_2$ is the Abbe number of the second lens element.

Another objective of the present invention to provide an optical lens assembly for image pickup, sequentially arranged from an object side to an image side along the optical axis, comprising: the first lens element, the second lens element and the third lens element, wherein the first lens element with negative refractive power has a convex object-side surface and a concave image-side surface; the second lens element with positive refractive power is made of plastic and has both convex object-side surface and image-side surface, and at least one of the object-side surface and image-side surface is aspheric; the third lens element with negative refractive power is made of plastic and has a convex object-side surface and a concave image-side surface, and at least one of the object-side surface and image-side surface is aspheric; and the optical lens assembly for image pickup satisfies the following relations:

$$0.15<T_{12}/CT_2<0.8 \quad (5)$$

$$0.3<(CT_1+CT_3)/CT_2<0.78 \quad (4)$$

Wherein, $T_{12}$ is the axial distance between the first lens element and the second lens element, $CT_1$ is the central thickness of the first lens element, $CT_2$ is the central thickness of the second lens element, and $CT_3$ is the central thickness of the third lens element.

On the other hand, the present invention provides an optical lens assembly for image pickup as described above, wherein the optical lens assembly for image pickup satisfies one or more of the following relations in addition to the relations (5) and (4):

$$0<R_5<R_3 \quad (1)$$

$$-0.7<R_4/f<0 \quad (6)$$

$$0<R_6/f<0.5 \quad (8)$$

$$25<v_2-v_1<42 \quad (9)$$

Wherein, $R_3$ is the curvature radius of the object-side surface of the second lens element, $R_4$ is the curvature radius of the image-side surface of the second lens element, $R_5$ is the curvature radius of the object-side surface of the third lens element, $R_6$ is the curvature radius of the image-side surface of the third lens element, f is the focal length of the optical lens assembly for image pickup, $v_1$ is the Abbe number of the first lens element, and $v_2$ is the Abbe number of the second lens element.

In the optical lens assembly for image pickup of the present invention, the first lens element adopts a lens element with negative refractive power to increase the view angle, and after the first lens element is combined with the second lens element with positive refractive power, the optical amplification can be increased to enhance the resolution of optical lens assembly for image pickup. The third lens element adopts a lens element with negative refractive power to effectively correct the aberration produced the first lens element and the second lens element, so that the aberration and distortion of the overall optical lens assembly for image pickup can meet the high resolution requirement.

In addition, the second lens element with positive refractive power and the third lens element with negative refractive power are complementary to each other to produce a telephoto structure, so as to facilitate reducing the rear focal length and the total length. If the third lens element has a concave image-side surface, the principal point of the optical lens assembly for image pickup will be far away from the image plane to facilitate reducing the total length of the optical lens assembly for image pickup, so as to promote the design of a compact system. With such arrangement, the image sensor can have a larger effective pixel range within the same total length of the optical lens assembly for image pickup. The first lens element having a concave image-side surface can increase the rear focal length of the optical system to assure that the optical lens assembly for image pickup has sufficient rear focal length for installing other components. In addition, the combination of the second lens element having a convex image-side surface and the third lens element having a convex object-side surface can reduce the total length of the optical lens assembly for image pickup effectively for its application in a compact electronic device.

In the optical lens assembly for image pickup of the present invention, if the stop is a middle stop, the view angle of the optical lens assembly for image pickup can be expanded, so that the optical lens assembly for image pickup has the advantages of a wide angle lens. The optical lens assembly for image pickup can further have two middle stops for restricting the angle of the light incident from the periphery of the optical system into the image sensor, not only facilitating the aberration correction, but also improving the light sensitivity of the optical system. In addition, the first lens element, second lens element and third lens element are made of plastic to make the manufacture easy with lower costs.

DETAILED DESCRIPTION OF THE PREFERRED EMBODIMENTS

Figure 1A:
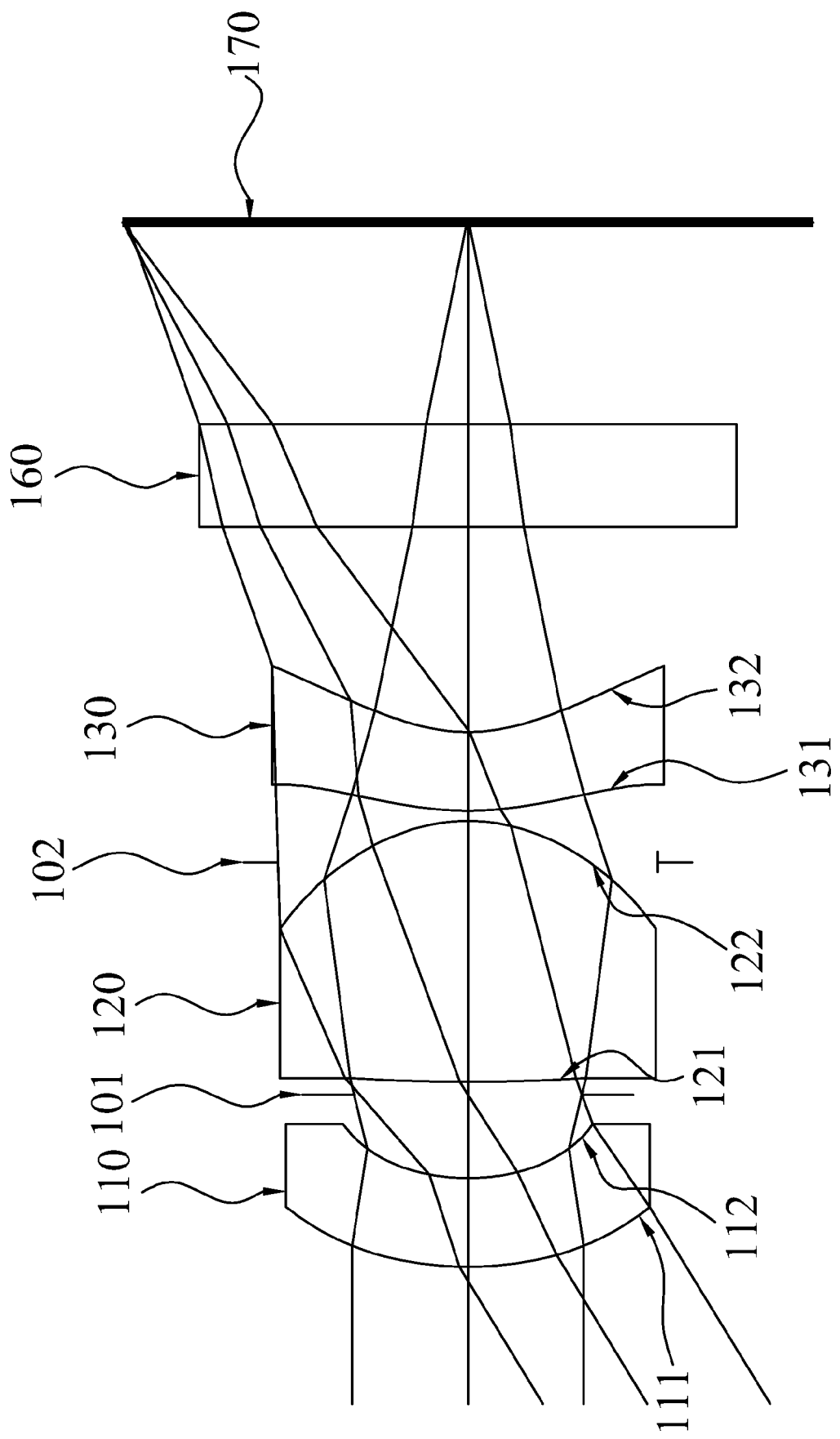
FIG. 1A is a schematic view of an optical lens assembly for image pickup in accordance with the first preferred embodiment of the present invention.

With reference to FIG. 1A for an optical lens assembly for image pickup in accordance with the present invention, the optical lens assembly for image pickup, sequentially arranged from an object side to an image side along an optical axis, comprising: the first lens element 110, the second lens element 120 and the third lens element 130, wherein the first lens element 110 with negative refractive power has a convex object-side surface 111 and a concave image-side surface 112; the second lens element 120 with positive refractive power has both convex object-side surface 121 and image-side surface 122; the third lens element 130 with negative refractive power is made of plastic, and has a convex object-side surface 131 and a concave image-side surface 132, and at least one of the object-side surface 131 and image-side surface 132 is aspheric. The optical lens assembly for image pickup further comprises a stop 101, a stop 102 and an IR-filter 160. The stop 101 is a middle aperture stop installed between the first lens element 110 and the second lens element 120. The stop 102 is installed between the second lens element 120 and the third lens element 130. The IR-filter 160 is installed between the third lens element 130 and an image plane 170, and generally made of panel glass without affecting the focal length of the optical lens assembly for image pickup of the present invention. The aspheric surfaces of the first lens element 110, second lens element 120, and third lens element 130 comply with the aspherical surface formula as given in Equation (14).

$$X(Y) = \frac{(Y^2/R)}{1+\sqrt{(1-(1+K)(Y/R)^2)}} + \sum_i (A_i) \cdot (Y^i) \quad (14)$$

Wherein,

X is the relative distance between a point on the aspherical surface with a distance Y away from the optical axis and a tangent plane at the vertex of the optical axis of the aspherical surface;

Y is the distance between a point on the curvature of the aspherical surface and the optical axis;

R is the curvature radius;

K is the conic coefficient; and $A_i$ is the $i^{th}$ level aspherical surface coefficient.

In the optical lens assembly for image pickup of the present invention, the first lens element 110, second lens element 120 and third lens element 130 have spherical or aspheric surfaces. The curvature radius of the optical surfaces can be used for changing the refractive power to reduce or eliminate aberrations, so as to reduce the required number of lenses used in the optical lens assembly for image pickup and shorten the total length of the optical lens assembly for image pickup effectively. With the arrangement of the first lens element 110, second lens element 120, and third lens element 130, the optical lens assembly for image pickup of the present invention satisfies the relations (1) and (2).

In the optical lens assembly for image pickup of the present invention, the first lens element 110 has a convex object-side surface with a weaker negative refractive power in order to limit the refractive angle of the incident light, so as to facilitate imaging and reducing the total length. The main positive refractive power of the optical lens assembly for image pickup is provided by the second lens element 120. If the relation (1) is satisfied, an appropriate refractive angle of the second lens element 120 can be achieved to facilitate the aberration correction and spherical aberration compensation. The refractive power of the second lens element 120 can be adjusted appropriately to be complementary with the refractive power of the third lens element 130 and to produce the telephoto structure, so as to facilitate reducing the rear focal length as well as the total length while achieving the effect of a compact lens. If the relation (2) is satisfied, the position of the stop can be adjusted appropriately to further reduce the length of the optical lens assembly for image pickup.

If the ratio of the focal length $f_1$ of the first lens element 110 to the focal length f of the optical lens assembly for image pickup is limited according to the relation (3), the refractive power of the first lens element 110 can be adjusted appropriately to adjust the focal length of the system to reduce the total length. If the relations (6), (7), (8) or (12) is satisfied, the focal length $f_2$ of the second lens element 120 and the focal length $f_3$ of the third lens element 130 can obtain balance under the limited conditions, and the required refractive power of the optical lens assembly for image pickup can be allocated appropriately to facilitate reducing the sensitivity and the production of aberration of the optical lens assembly for image pickup.

If the relation (4) or (13) is satisfied, the thickness of the first lens element 110, second lens element 120 and third lens element 130 can be adjusted appropriately to facilitate reducing the total length of the optical lens assembly for image pickup, so that its thickness will not be insufficient and thus enhancing the yield rate of the manufacture. If the relation (5) is satisfied, the thickness of the second lens element 120 and the distance between the first lens element 110 and the second lens element 120 can be adjusted appropriately to achieve a good balance between the reduction of the total length and the correction of image quality.

If the relation (9) or (10) is satisfied, the difference between the Abbe number $v_1$ of the first lens element 110, the Abbe number $v_2$ of the second lens element 120 and the Abbe number $v_3$ of the third lens element 130 fall within an appropriate range, which can correct the chromatic aberration produced by the first lens element 110, the second lens element 120 and the third lens element 130 effectively. If the relation (11) is satisfied, the incident angle of the light from the periphery of the system into the light sensor can be limited to facilitate the aberration correction.

The optical lens assembly for image pickup of the present invention is described by means of preferred embodiments with relevant drawings as follows.

First Preferred Embodiment

Figure 1B:
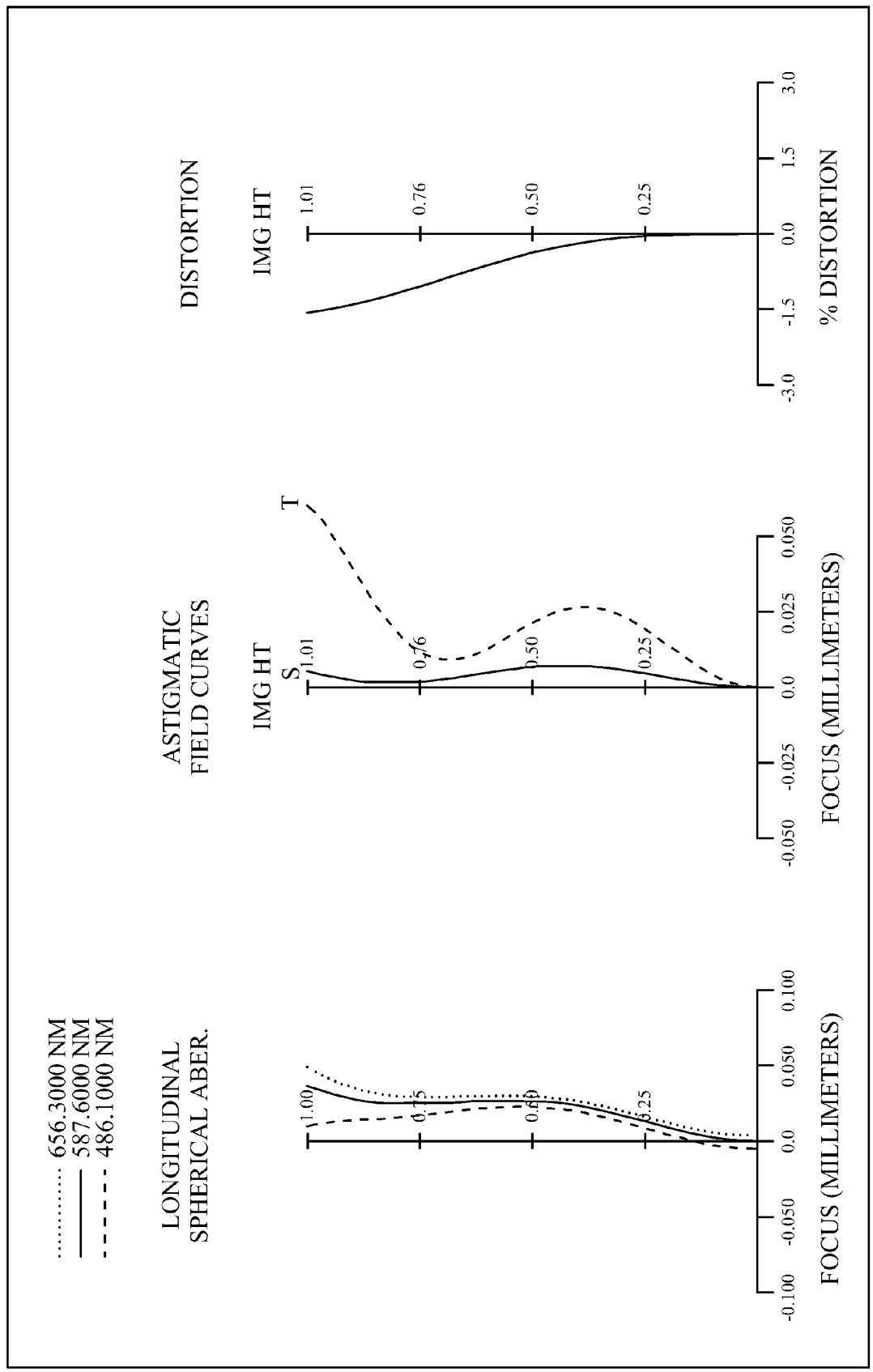
FIG. 1B is a schematic view of a series of aberration curves of the first preferred embodiment of the present invention.

With reference to FIGS. 1A and 1B for a schematic view and a series of aberration curves of an optical lens assembly for image pickup in accordance with the first preferred embodiment of the present invention respectively, the optical lens assembly for image pickup, sequentially arranged from an object side to an image side along an optical axis, comprises: the first lens element 110 with negative refractive power, made of plastic, and having a convex object-side surface 111 and a concave image-side surface 112, and both object-side surface 111 and image-side surface 112 being aspheric; a stop 101; a second lens element 120 with positive refractive power, made of plastic, and having a convex object-side surface 121 and a convex image-side surface 122, and both object-side surface 121 and image-side surface 122 being aspheric; a stop 102; a third lens element 130 with negative refractive power, made of plastic, and having a convex object-side surface 131 and a concave image-side surface 132, and both object-side surface 131 and image-side surface 132 being aspheric; and an IR-filter 160 made of panel glass for adjusting a wavelength section of the light of an image. With the combination of the three lens elements, the stop 101, stop 102 and IR-filter 160, an image of the photographed object can be formed at an image plane 170.

TABLE 1

Optical data of the first preferred embodiment
f = 1.66 mm, Fno = 2.45, HFOV = 31.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.024749 (ASP) | 0.260 | Plastic | 1.640 | 23.3 | −3.40 |
| 2 | | 0.627784 (ASP) | 0.244 | | | | |
| 3 | Ape. Stop | Plano | 0.037 | | | | |
| 4 | Lens 2 | 5.388287 (ASP) | 0.763 | Plastic | 1.544 | 55.9 | 0.94 |
| 5 | | −0.534619 (ASP) | −0.120 | | | | |
| 6 | Stop | Plano | 0.150 | | | | |
| 7 | Lens 3 | 0.917181 (ASP) | 0.230 | Plastic | 1.640 | 23.3 | −2.28 |
| 8 | | 0.508399 (ASP) | 0.600 | | | | |
| 9 | IR-filter | Plano | 0.300 | Glass | 1.517 | 64.2 | — |
| 10 | | Plano | 0.590 | | | | |
| 11 | Image | Plano | — | | | | |

Note:
Reference wavelength is 587.6 nm.
ASP stands for aspherical surfaces.
The effective radius of the sixth surface is 0.555 mm.

The optical data of this preferred embodiment are listed in Table 1, wherein the object-side surface and the image-side surface of the first lens element 110 to the third lens element 130 comply with the aspheric surface formula as given in Equation (14), and their aspheric coefficients are listed in Table 2 as follows:

TABLE 2

Aspheric coefficients of the first preferred embodiment
Aspheric Coefficients

| | Surface # | | | | | |
|---|---|---|---|---|---|---|
| | 1 | 2 | 4 | 5 | 7 | 8 |
| k = | 0.00000E+00 | 0.00000E+00 | −1.00000E+00 | −1.00000E+00 | −9.55189E+00 | −1.00000E+00 |
| A4 = | 2.85089E−01 | 1.20102E+00 | 5.78415E−02 | −1.88878E−01 | −2.73318E−01 | −2.44182E+00 |
| A6 = | 8.09493E−01 | 7.77921E+00 | 7.76011E−01 | 1.11509E+00 | 3.22964E−01 | 8.21349E+00 |
| A8 = | −6.55865E+00 | −6.35544E+01 | −1.36539E+01 | −1.08805E+01 | −4.00107E+00 | −2.12531E+01 |
| A10 = | 2.46357E+01 | 5.02402E+02 | 3.85854E+01 | 2.47055E+01 | 1.78682E+01 | 2.77632E+01 |
| A12 = | −3.23734E+01 | 3.37193E−05 | 3.37163E−05 | −2.46511E+01 | −4.97574E+01 | −1.43663E+01 |
| A14 = | 3.38750E−05 | | | 3.35488E−05 | −1.03708E+01 | 5.50714E+00 |
| A16 = | | | | | 1.63915E+02 | 3.40698E−05 |

With reference to Table 1 and FIG. 1B for an optical lens assembly for image pickup of this preferred embodiment, the optical lens assembly for image pickup has a focal length f=1.66 (mm), an f-number Fno=2.45, and a half of maximum view angle HFOV=31.4°. After the optical data of this preferred embodiment are calculated and derived, the optical imaging system for pickup satisfies related conditions as shown in Table 3 below, and the related symbols have been described above and thus will not be described again.

TABLE 3

Data of related relations of the first preferred embodiment

| Relation | Data | Relation | Data |
|---|---|---|---|
| $V_2-V_1$ | 32.6 | $R_6/f$ | 0.31 |
| $V_2-V_1-V_3$ | 9.3 | $f/f_1$ | −0.49 |
| $T_{12}/CT_2$ | 0.37 | $f/f_2$ | 1.77 |
| $(CT_1+CT_3)/CT_2$ | 0.64 | $S_D/T_D$ | 0.68 |
| $R_4/f$ | −0.32 | | |

According to the optical data as shown in Table 1 and the series of aberration curves as shown in FIG. 1B, the optical lens assembly for image pickup in accordance with this preferred embodiment of the present invention provides good correction results in aspects of the longitudinal spherical aberration, astigmatic field curving, and distortion.

Second Preferred Embodiment

Figure 2A:
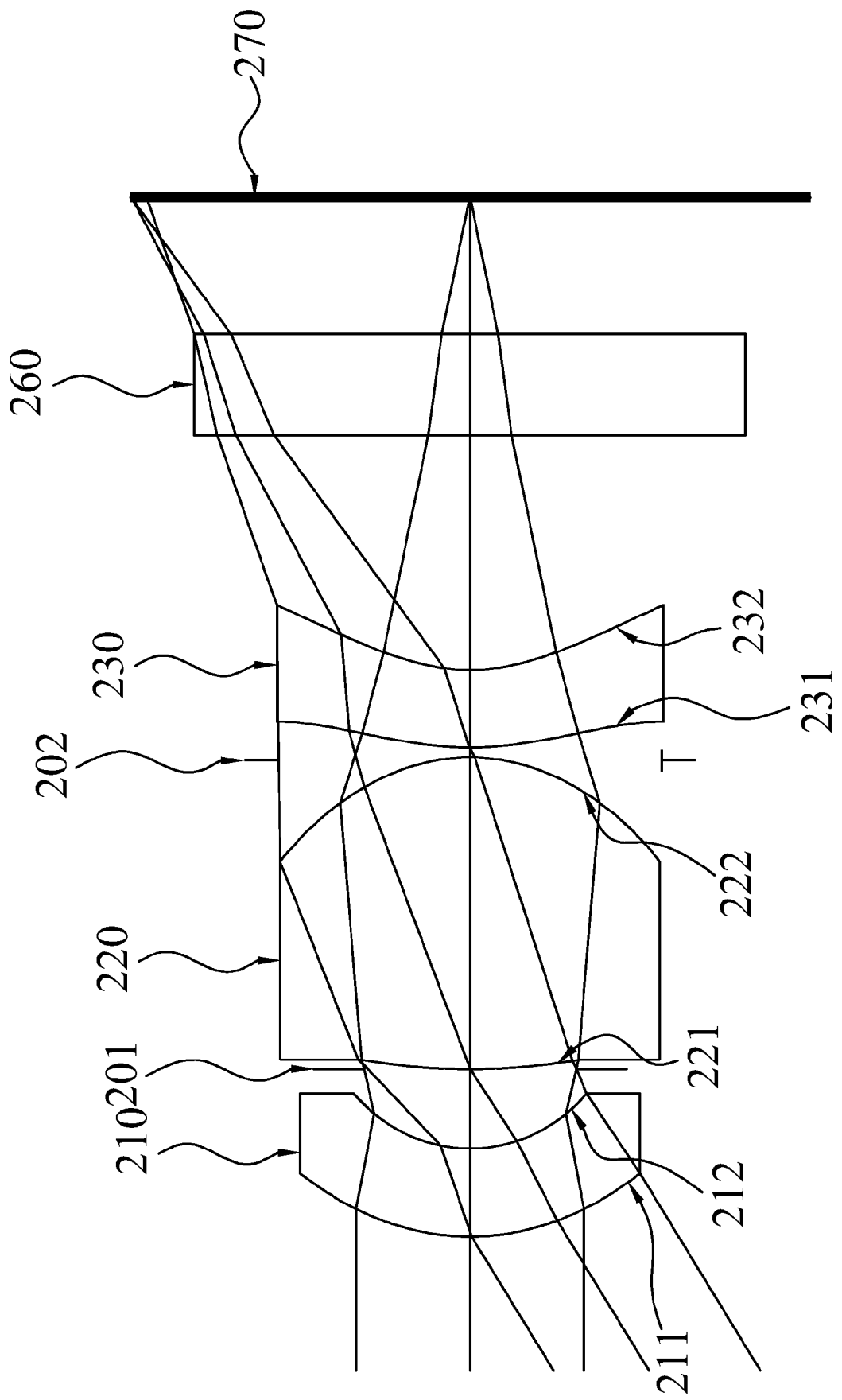
FIG. 2A is a schematic view of an optical lens assembly for image pickup in accordance with the second preferred embodiment of the present invention.
Figure 2B:
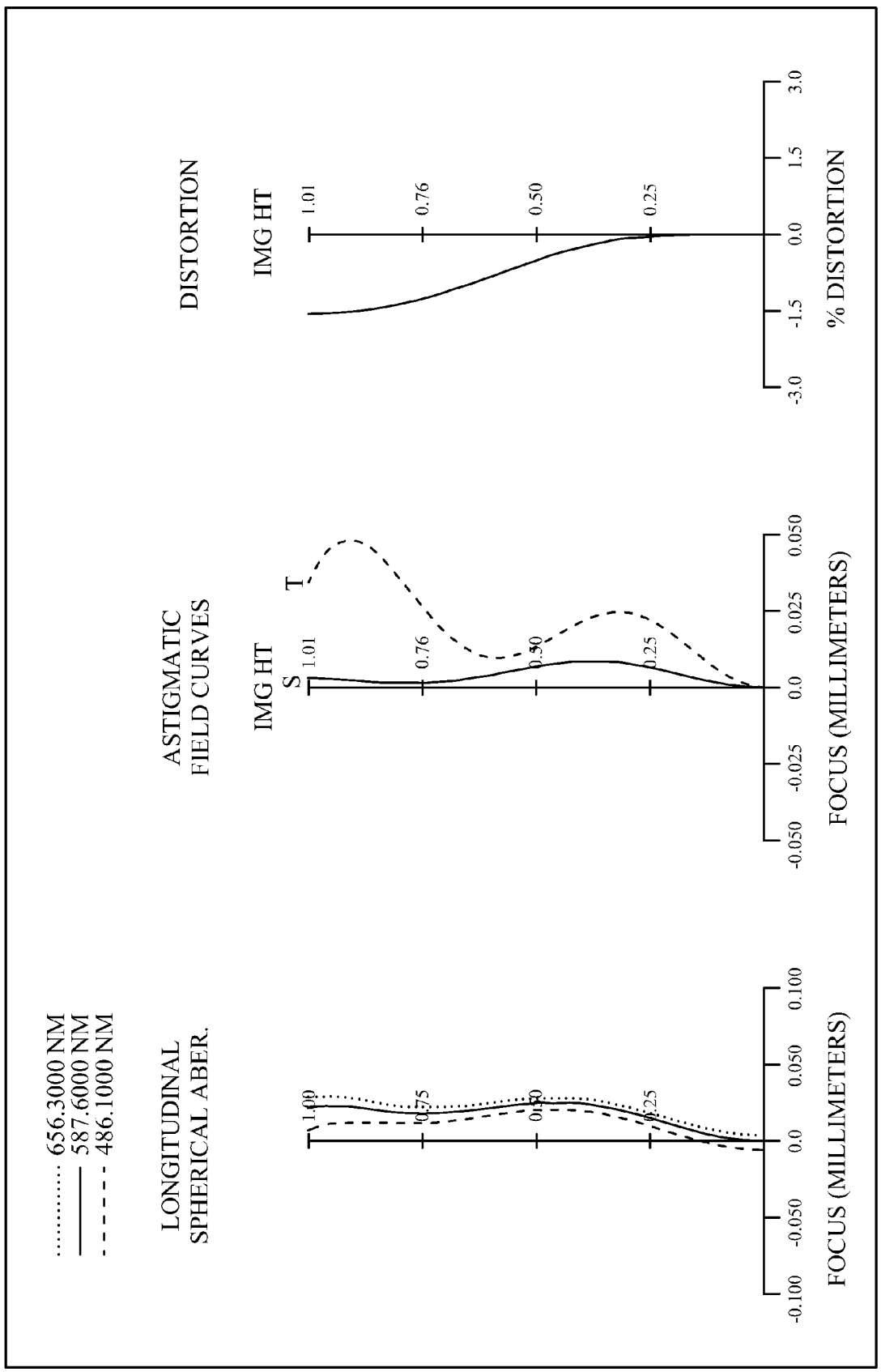
FIG. 2B is a schematic view of a series of aberration curves of the second preferred embodiment of the present invention.

With reference to FIGS. 2A and 2B for a schematic view and a series of aberration curves of an optical lens assembly for image pickup in accordance with the second preferred embodiment of the present invention respectively, the optical lens assembly for image pickup, sequentially arranged from an object side to an image side along an optical axis, comprises: the first lens element 210 with negative refractive power, made of plastic, and having a convex object-side surface 211 and a concave image-side surface 212, and both object-side surface 211 and image-side surface 212 being aspheric; an stop 201; the second lens element 220 with positive refractive power, made of plastic, and having a convex object-side surface 221 and a convex image-side surface 222, and both object-side surface 221 and image-side surface 222 being aspheric; a stop 202; the third lens element 230 with negative refractive power, made of plastic, and having a convex object-side surface 231 and a concave image-side surface 232, and both object-side surface 231 and image-side surface 232 being aspheric; and an IR-filter 260 made of panel glass for adjusting a wavelength section of the light of an image. With the combination of the three lens elements, the stop 201, stop 202 and IR-filter 260, an image of the photographed object can be formed at an image plane 270.

TABLE 4

Optical data of the second preferred embodiment
f = 1.66 mm, Fno = 2.45, HFOV = 31.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.731593 (ASP) | 0.262 | Plastic | 1.640 | 23.3 | −2.72 |
| 2 | | 0.443276 (ASP) | 0.237 | | | | |
| 3 | Ape. Stop | Plano | 0.000 | | | | |
| 4 | Lens 2 | 1.993817 (ASP) | 0.928 | Plastic | 1.544 | 55.9 | 0.94 |
| 5 | | −0.573148 (ASP) | −0.009 | | | | |
| 6 | Stop | Plano | 0.039 | | | | |
| 7 | Lens 3 | 0.951903 (ASP) | 0.230 | Plastic | 1.640 | 23.3 | −2.52 |
| 8 | | 0.542003 (ASP) | 0.700 | | | | |
| 9 | IR-filter | Plano | 0.300 | Glass | 1.517 | 64.2 | — |
| 10 | | Plano | 0.408 | | | | |
| 11 | Image | Plano | — | | | | |

Note:
Reference wavelength is 587.6 nm.
ASP stands for aspherical surfaces.
The effective radius of the sixth surface is 0.57 mm.

The optical data of this preferred embodiment are listed in Table 4, wherein the object-side surface and the image-side surface of the first lens element 210 to the third lens element 230 comply with the aspheric surface formula as given in Equation (14), and their aspheric coefficients are listed in Table 5 as follows:

TABLE 5

Aspheric coefficients of the second preferred embodiment
Aspheric Coefficients

| | Surface # | | | | | |
|---|---|---|---|---|---|---|
| | 1 | 2 | 4 | 5 | 7 | 8 |
| k = | 0.00000E+00 | 0.00000E+00 | −1.00000E+00 | −1.00000E+00 | −1.26548E+01 | −1.00000E+00 |
| A4 = | −6.59558E−02 | 2.11554E−01 | 3.51833E−02 | −3.83937E−01 | −1.10423E−02 | −2.04830E+00 |
| A6 = | −2.07534E−01 | −4.55336E+00 | 1.42755E+00 | 2.58638E+00 | −1.18052E+00 | 6.48125E+00 |
| A8 = | −4.79786E+00 | 3.33125E+01 | −2.32877E+01 | −1.51992E+01 | 1.18837E+00 | −1.59166E+01 |
| A10 = | 1.98405E+01 | −1.77722E+02 | 1.05266E+02 | 3.29019E+01 | 1.18758E+01 | 2.11496E+01 |
| A12 = | −3.16355E+01 | 2.91273E−05 | 2.91250E−05 | −2.57894E+01 | −5.00173E+01 | −1.39605E+01 |
| A14 = | −6.88757E+00 | | | −7.60266E−01 | −1.04396E+01 | 6.03024E+00 |
| A16 = | | | | | 1.62333E+02 | 3.02879E+00 |

With reference to Table 4 and FIG. 2B for an optical lens assembly for image pickup of this preferred embodiment, the optical lens assembly for image pickup has a focal length f=1.66 (mm), an f-number Fno=2.45, and a half of maximum view angle HFOV=31.4°. After the optical data of this preferred embodiment are calculated and derived, the optical imaging system for pickup satisfies related conditions as shown in Table 6 below, and the related symbols have been described above and thus will not be described again.

TABLE 6

Data of related relations of the second preferred embodiment

| Relation | Data | Relation | Data |
|---|---|---|---|
| $V_2-V_1$ | 32.6 | $R_6/f$ | 0.33 |
| $V_2-V_1-V_3$ | 9.3 | $f/f_1$ | −0.61 |
| $T_{12}/CT_2$ | 0.26 | $f/f_2$ | 1.77 |
| $(CT_1+CT_3)/CT_2$ | 0.53 | $S_D/T_D$ | 0.70 |
| $R_4/f$ | −0.35 | | |

According to the optical data as shown in Table 4 and the series of aberration curves as shown in FIG. 2B, the optical lens assembly for image pickup in accordance with this preferred embodiment of the present invention provides good correction results in aspects of the longitudinal spherical aberration, astigmatic field curving, and distortion.

Third Preferred Embodiment

Figure 3A:
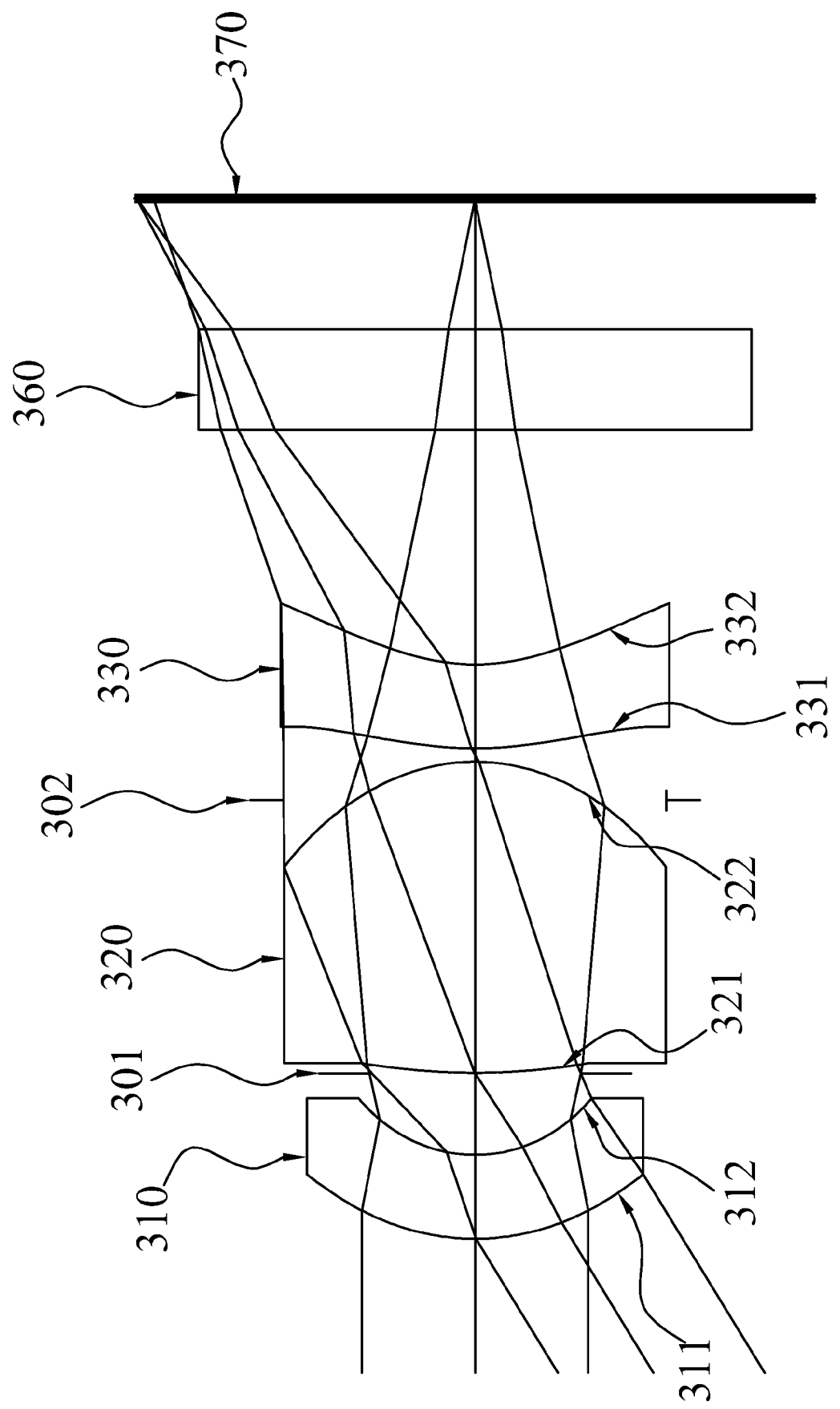
FIG. 3A is a schematic view of an optical lens assembly for image pickup in accordance with the third preferred embodiment of the present invention.
Figure 3B:
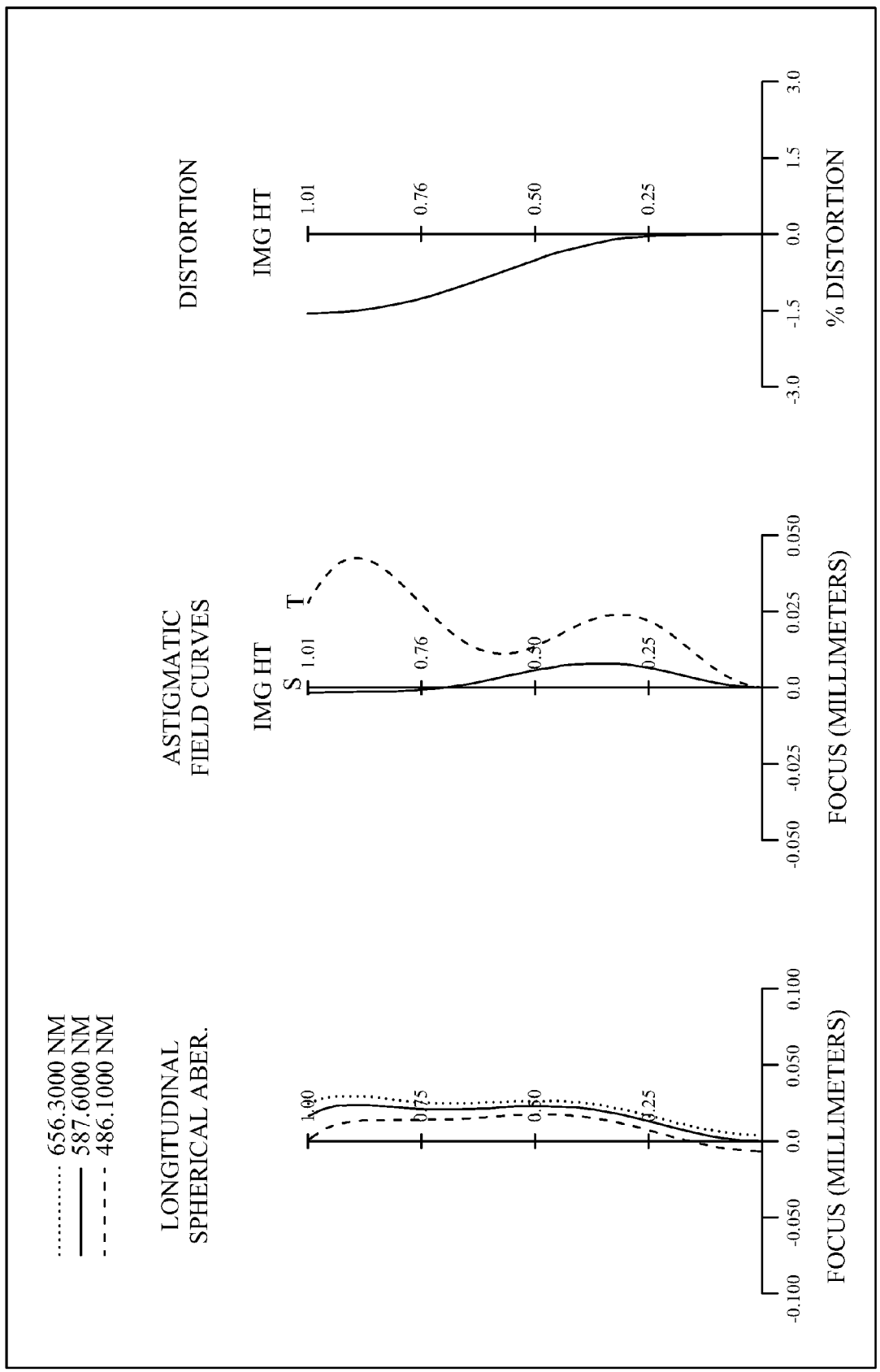
FIG. 3B is a schematic view of a series of aberration curves of the third preferred embodiment of the present invention.

With reference to FIGS. 3A and 3B for a schematic view and a series of aberration curves of an optical lens assembly for image pickup in accordance with the third preferred embodiment of the present invention respectively, the optical lens assembly for image pickup, sequentially arranged from an object side to an image side along an optical axis, comprises: the first lens element 310 with negative refractive power, made of plastic, and having a convex object-side surface 311 and a concave image-side surface 312, and both object-side surface 311 and image-side surface 312 being aspheric; an stop 301; the second lens element 320 with positive refractive power, made of plastic, and having a convex object-side surface 321 and a convex image-side surface 322, and both object-side surface 321 and image-side surface 322 being aspheric; a stop 302; the third lens element 330 with negative refractive power, made of plastic, and having a convex object-side surface 331 and a concave image-side surface 332, and both object-side surface 331 and image-side surface 332 being aspheric; and an IR-filter 360 made of panel glass for adjusting a wavelength section of the light of an image. With the combination of the three lens elements, the stop 301, stop 302 and IR-filter 360, an image of the photographed object can be formed at an image plane 370.

TABLE 7

Optical data of the third preferred embodiment
f = 1.66 mm, Fno = 2.46, HFOV = 31.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.701250 (ASP) | 0.250 | Plastic | 1.640 | 23.3 | −2.76 |
| 2 | | 0.431960 (ASP) | 0.243 | | | | |
| 3 | Ape. Stop | Plano | 0.002 | | | | |
| 4 | Lens 2 | 2.011210 (ASP) | 0.927 | Plastic | 1.544 | 55.9 | 0.96 |
| 5 | | −0.589080 (ASP) | −0.115 | | | | |
| 6 | Stop | Plano | 0.155 | | | | |
| 7 | Lens 3 | 1.063030 (ASP) | 0.250 | Plastic | 1.640 | 23.3 | −2.70 |
| 8 | | 0.597440 (ASP) | 0.700 | | | | |
| 9 | IR-filter | Plano | 0.300 | Glass | 1.517 | 64.2 | — |
| 10 | | Plano | 0.389 | | | | |
| 11 | Image | Plano | — | | | | |

Note:
Reference wavelength is 587.6 nm.
ASP stands for aspherical surfaces.
The effective radius of the sixth surface is 0.57 mm.

The optical data of this preferred embodiment are listed in Table 7, wherein the object-side surface and the image-side surface of the first lens element 310 to the third lens element 330 comply with the aspheric surface formula as given in Equation (14), and their aspheric coefficients are listed in Table 8 as follows:

TABLE 8

Aspheric coefficients of the third preferred embodiment
Aspheric Coefficients

| | Surface # | | | | | |
|---|---|---|---|---|---|---|
| | 1 | 2 | 4 | 5 | 7 | 8 |
| k = | 0.00000E+00 | 0.00000E+00 | −1.00000E+00 | −1.00000E+00 | −1.66531E+01 | −1.00000E+00 |
| A4 = | −8.42228E−02 | 7.00402E−02 | 2.60715E−02 | −5.07009E−01 | 6.91948E−02 | −1.62730E+00 |
| A6 = | −2.62728E−01 | −3.45663E+00 | 7.00224E−01 | 2.84436E+00 | −1.63434E+00 | 4.74313E+00 |
| A8 = | −4.72747E+00 | 1.85837E+01 | −1.90459E+01 | −1.54971E+01 | 1.91143E+00 | −1.19300E+01 |
| A10 = | 1.87816E+01 | −1.73359E+02 | 9.56824E+01 | 3.28485E+01 | 1.17809E+01 | 1.75139E+01 |
| A12 = | −3.16355E+01 | 2.91267E−05 | 2.91238E−05 | −2.57895E+01 | −5.00173E+01 | −1.39605E+01 |
| A14 = | −6.88757E+00 | | | −7.60273E−01 | −1.04396E+01 | 6.03024E+00 |
| A16 = | | | | | 1.62333E+02 | 3.02880E+00 |

With reference to Table 7 and FIG. 3B for an optical lens assembly for image pickup of this preferred embodiment, the optical lens assembly for image pickup has a focal length f=1.66 (mm), an f-number Fno=2.46, and a half of maximum view angle HFOV=31.4°. After the optical data of this preferred embodiment are calculated and derived, the optical imaging system for pickup satisfies related conditions as shown in Table 9 below, and the related symbols have been described above and thus will not be described again.

TABLE 9

Data of related relations of the third preferred embodiment

| Relation | Data | Relation | Data |
|---|---|---|---|
| $V_2-V_1$ | 32.6 | $R_6/f$ | 0.36 |
| $v_2-v_1-v_3$ | 9.3 | $f/f_1$ | −0.60 |
| $T_{12}/CT_2$ | 0.26 | $f/f_2$ | 1.73 |
| $(CT_1+CT_3)/CT_2$ | 0.54 | $S_D/T_D$ | 0.71 |
| $R_4/f$ | −0.35 | | |

According to the optical data as shown in Table 7 and the series of aberration curves as shown in FIG. 3B, the optical lens assembly for image pickup in accordance with this preferred embodiment of the present invention provides good correction results in aspects of the longitudinal spherical aberration, astigmatic field curving, and distortion.

Fourth Preferred Embodiment

Figure 4A:
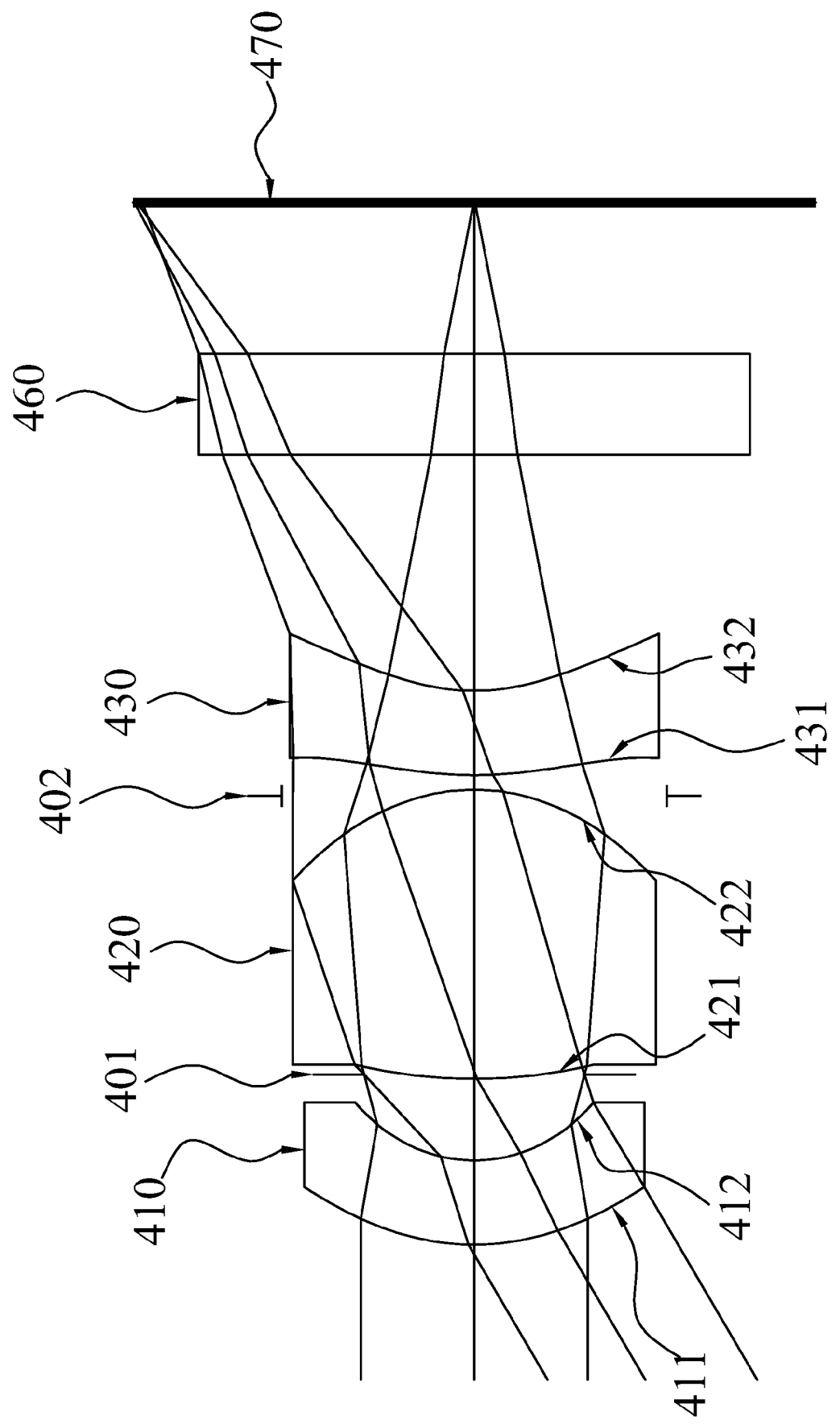
FIG. 4A is a schematic view of an optical lens assembly for image pickup in accordance with the fourth preferred embodiment of the present invention.
Figure 4B:
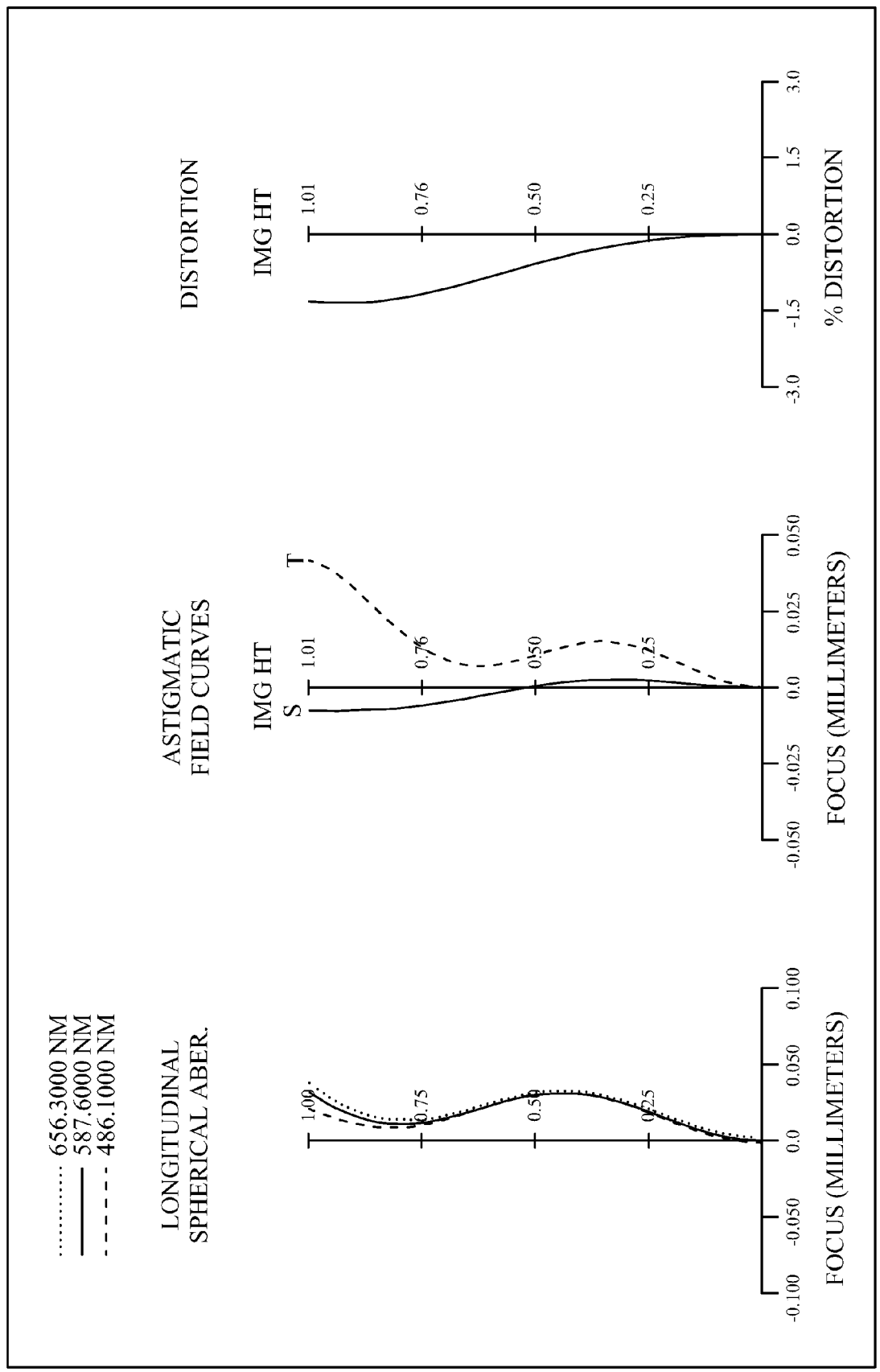
FIG. 4B is a schematic view of a series of aberration curves of the fourth preferred embodiment of the present invention.

With reference to FIGS. 4A and 4B for a schematic view and a series of aberration curves of an optical lens assembly for image pickup in accordance with the fourth preferred embodiment of the present invention respectively, the optical lens assembly for image pickup, sequentially arranged from an object side to an image side along an optical axis, comprises: the first lens element 410 with negative refractive power, made of plastic, and having a convex object-side surface 411 and a concave image-side surface 412, and both object-side surface 411 and image-side surface 412 being aspheric; an stop 401; the second lens element 420 with positive refractive power, made of plastic, and having a convex object-side surface 421 and a convex image-side surface 422, and both object-side surface 421 and image-side surface 422 being aspheric; a stop 402; the third lens element 430 with negative refractive power, made of plastic, and having a convex object-side surface 431 and a concave image-side surface 432, and both object-side surface 431 and image-side surface 432 being aspheric; and an IR-filter 460 made of panel glass for adjusting a wavelength section of the light of an image. With the combination of the three lens elements, the stop 401, stop 402 and IR-filter 460, an image of the photographed object can be formed at an image plane 470.

TABLE 10

Optical data of the fourth preferred embodiment
f = 1.73 mm, Fno = 2.58, HFOV = 30.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.741225 (ASP) | 0.250 | Plastic | 1.634 | 23.8 | −2.36 |
| 2 | | 0.430688 (ASP) | 0.254 | | | | |
| 3 | Ape. Stop | Plano | −0.012 | | | | |
| 4 | Lens 2 | 1.543441 (ASP) | 0.858 | Plastic | 1.544 | 55.9 | 0.92 |
| 5 | | −0.592594 (ASP) | −0.018 | | | | |
| 6 | Stop | Plano | 0.062 | | | | |
| 7 | Lens 3 | 1.148140 (ASP) | 0.250 | Plastic | 1.640 | 23.3 | −2.37 |
| 8 | | 0.597352 (ASP) | 0.700 | | | | |
| 9 | IR-filter | Plano | 0.300 | Glass | 1.517 | 64.2 | — |

TABLE 10-continued

Optical data of the fourth preferred embodiment
f = 1.73 mm, Fno = 2.58, HFOV = 30.3 deg.

| Surface # | | Curvature Radius | Thickness | Material | Index | Abbe # | Focal length |
|---|---|---|---|---|---|---|---|
| 10 | | Plano | 0.449 | | | | |
| 11 | Image | Plano | — | | | | |

Note:
Reference wavelength is 587.6 nm.
ASP stands for aspherical surfaces.
The effective radius of the sixth surface is 0.57 mm.

The optical data of this preferred embodiment are listed in Table 10, wherein the object-side surface and the image-side surface of the first lens element 410 to the third lens element 430 comply with the aspheric surface formula as given in Equation (14), and their aspheric coefficients are listed in Table 11 as follows:

TABLE 11

Aspheric coefficients of the fourth preferred embodiment
Aspheric Coefficients

| | Surface # | | | | | |
|---|---|---|---|---|---|---|
| | 1 | 2 | 4 | 5 | 7 | 8 |
| k = | 0.00000E+00 | 0.00000E+00 | −1.00000E+00 | −1.00000E+00 | −1.79356E+01 | −1.00000E+00 |
| A4 = | −1.50074E−01 | 1.66049E−01 | 2.72324E−02 | −4.44818E−01 | −9.82562E−02 | −1.67723E+00 |
| A6 = | −7.92340E−01 | −1.34190E+01 | 2.37969E+00 | 2.64850E+00 | −1.27040E+00 | 4.93515E+00 |
| A8 = | −5.66877E+00 | 1.04907E+02 | −2.27972E+01 | −1.56963E+00 | 1.98691E+00 | −1.19649E+01 |
| A10 = | 3.42366E+01 | −4.39544E+02 | 8.23648E+01 | 3.63029E+01 | 9.51324E+00 | 1.70356E+01 |
| A12 = | −6.03003E+01 | 2.97229E−05 | 2.95737E−05 | −2.57814E+01 | −5.00195E+01 | −1.39618E+01 |
| A14 = | −6.88757E+00 | | | −7.60273E−01 | −1.04396E+01 | 6.02624E+00 |
| A16 = | | | | | 1.62333E+02 | 3.02880E+00 |

With reference to Table 10 and FIG. 4B for an optical lens assembly for image pickup of this preferred embodiment, the optical lens assembly for image pickup has a focal length f=1.73 (mm), an f-number Fno=2.58, and a half of maximum view angle HFOV=30.3°. After the optical data of this preferred embodiment are calculated and derived, the optical imaging system for pickup satisfies related conditions as shown in Table 12 below, and the related symbols have been described above and thus will not be described again.

TABLE 12

Data of related relations of the
fourth preferred embodiment

| Relation | Data | Relation | Data |
|---|---|---|---|
| $V_2-V_1$ | 32.1 | $R_6/f$ | 0.34 |
| $v_2-v_1-v_3$ | 8.8 | $f/f_1$ | −0.74 |
| $T_{12}/CT_2$ | 0.28 | $f/f_2$ | 1.88 |
| $(CT_1+CT_3)/CT_2$ | 0.58 | $S_D/T_D$ | 0.69 |
| $R_4/f$ | −0.34 | | |

According to the optical data as shown in Table 10 and the series of aberration curves as shown in FIG. 4B, the optical lens assembly for image pickup in accordance with this preferred embodiment of the present invention provides good correction results in aspects of the longitudinal spherical aberration, astigmatic field curving, and distortion.

Fifth Preferred Embodiment

Figure 5A:
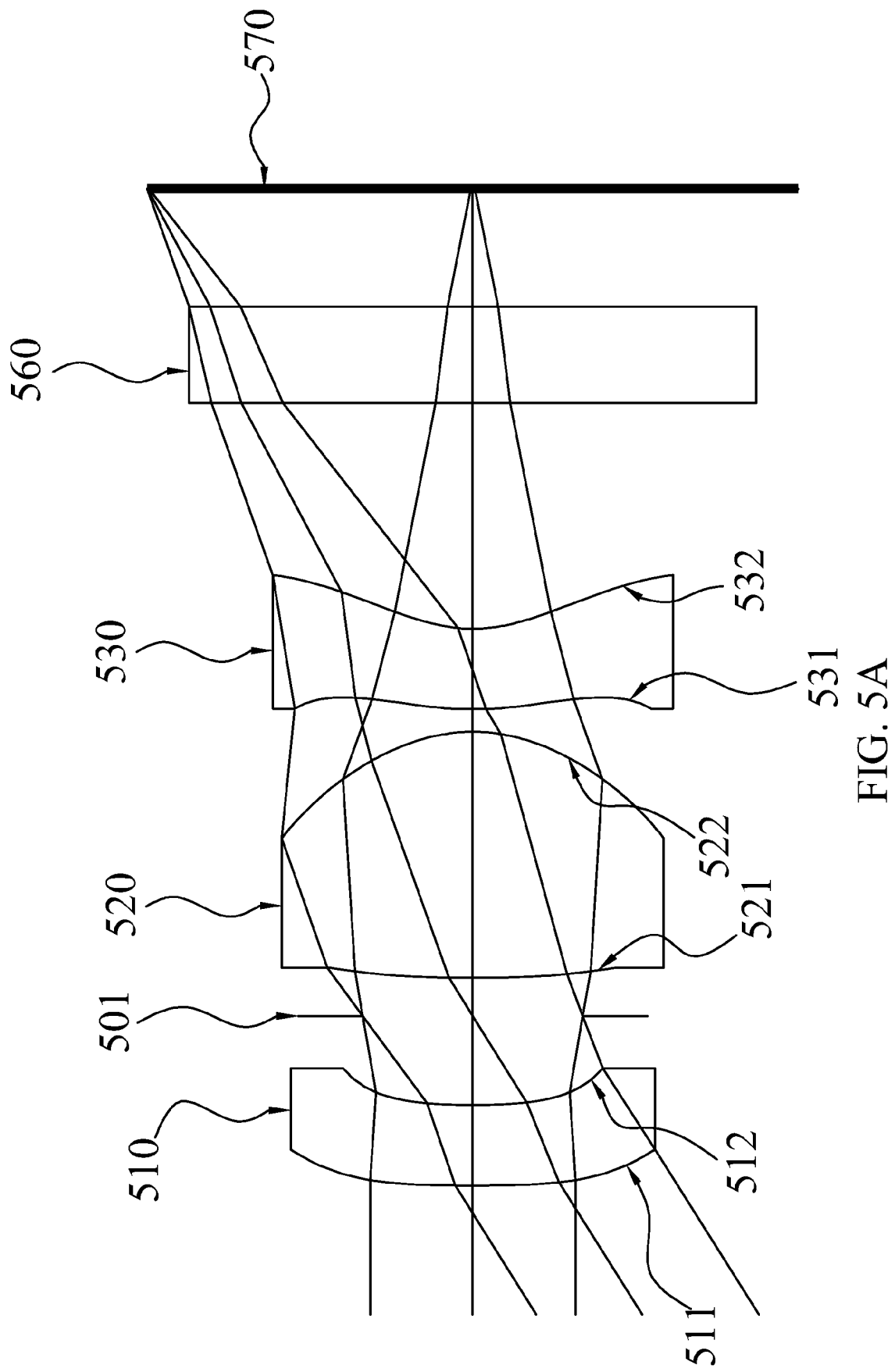
FIG. 5A is a schematic view of an optical lens assembly for image pickup in accordance with the fifth preferred embodiment of the present invention.
Figure 5B:
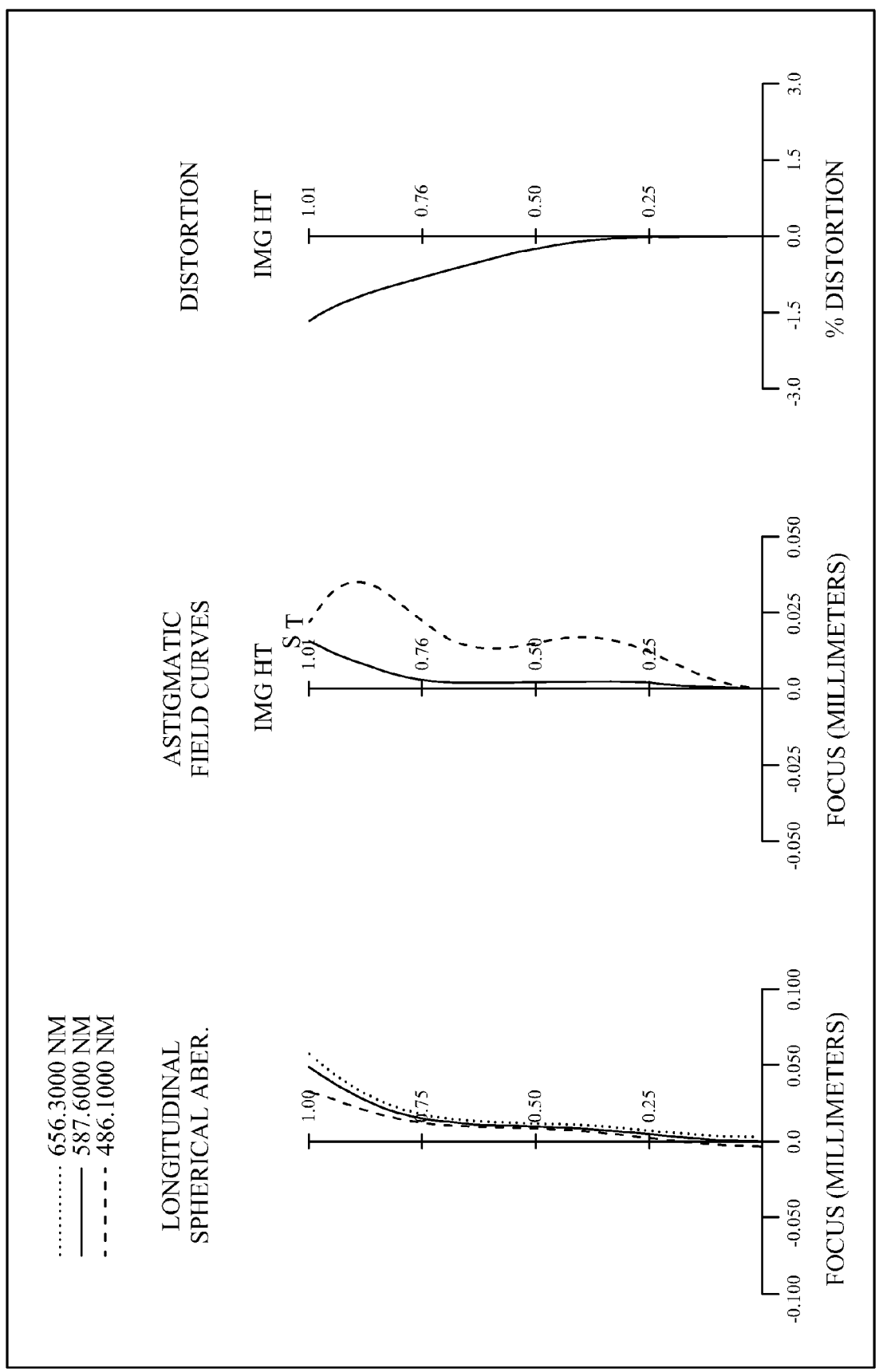
FIG. 5B is a schematic view of a series of aberration curves of the fifth preferred embodiment of the present invention.

With reference to FIGS. 5A and 5B for a schematic view and a series of aberration curves of an optical lens assembly for image pickup in accordance with the fifth preferred embodiment of the present invention respectively, the optical lens assembly for image pickup, sequentially arranged from an object side to an image side along an optical axis, comprises: the first lens element 510 with negative refractive power, made of plastic, having a convex object-side surface 511 and a concave image-side surface 512, and both object-side surface 511 and image-side surface 512 being aspheric; an stop 501; the second lens element 520 with positive refractive power, made of plastic, having a convex object-side surface 521 and a convex image-side surface 522, and both object-side surface 521 and image-side surface 522 being aspheric; the third lens element 530 with negative refractive power, made of plastic, having a convex object-side surface 531 and a concave image-side surface 532, and both object-side surface 531 and image-side surface 532 being aspheric; and an IR-filter 560 made of panel glass for adjusting a wavelength section of the light of an image. With the combination of the three lens elements, the stop 501 and the IR-filter 560, an image of the photographed object can be formed at an image plane 570.

TABLE 13

Optical data of the fifth preferred embodiment
f = 1.62 mm, Fno = 2.54, HFOV = 32.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 7.076478 (ASP) | 0.250 | Plastic | 1.640 | 23.3 | −5.32 |
| 2 | | 2.265326 (ASP) | 0.277 | | | | |
| 3 | Ape. Stop | Plano | 0.118 | | | | |
| 4 | Lens 2 | 5.375903 (ASP) | 0.763 | Plastic | 1.544 | 55.9 | 0.94 |
| 5 | | −0.540128 (ASP) | 0.070 | | | | |
| 6 | Lens 3 | 1.009946 (ASP) | 0.250 | Plastic | 1.630 | 23.8 | −1.65 |
| 7 | | 0.464163 (ASP) | 0.700 | | | | |
| 8 | IR-filter | Plano | 0.300 | Glass | 1.517 | 64.2 | — |
| 9 | | Plano | 0.366 | | | | |
| 10 | Image | Plano | — | | | | |

Note:
Reference wavelength is 587.6 nm.
ASP stands for aspherical surfaces.

The optical data of this preferred embodiment are listed in Table 13, wherein the object-side surface and the image-side surface of the first lens element 510 to the third lens element 530 comply with the aspheric surface formula as given in Equation (14), and their aspheric coefficients are listed in Table 14 as follows:

TABLE 14

Aspheric coefficients of the fifth preferred embodiment
Aspheric Coefficients

| | Surface # | | | | | |
|---|---|---|---|---|---|---|
| | 1 | 2 | 4 | 5 | 6 | 7 |
| k = | 0.00000E+00 | 0.00000E+00 | −1.00000E+00 | −1.00000E+00 | −6.12864E+00 | −1.00000E+00 |
| A4 = | 1.01558E+00 | 2.14535E+00 | 5.94096E−01 | 1.20110E−01 | −1.49783E+00 | −3.66399E+00 |
| A6 = | −4.98053E−01 | 2.49398E+00 | −1.10461E+00 | 9.97311E−01 | 3.03546E+00 | 1.20627E+01 |
| A8 = | 1.38203E−01 | −1.33355E+00 | −2.45271E−01 | −9.06026E+00 | −8.88995E+00 | −3.25988E+01 |
| A10 = | 1.21327E+00 | 1.11237E+02 | −5.39483E+00 | 2.17436E+01 | 1.65993E+01 | 5.19070E+01 |
| A12 = | 1.42861E+00 | 4.11669E−01 | −2.03115E+00 | −2.17899E+01 | −4.71079E+01 | −3.79663E+01 |
| A14 = | −1.22052E+01 | | | −2.08798E+00 | −1.02681E+01 | 3.57810E+00 |
| A16 = | | | | | 1.62863E+02 | 4.98769E+00 |

With reference to Table 13 and FIG. 5B for an optical lens assembly for image pickup of this preferred embodiment, the optical lens assembly for image pickup has a focal length f=1.62 (mm), an f-number Fno=2.54, and a half of maximum view angle HFOV=32.2°. After the optical data of this preferred embodiment are calculated and derived, the optical imaging system for pickup satisfies related conditions as shown in Table 15 below, and the related symbols have been described above and thus will not be described again.

TABLE 15

Data of related relations of the
fifth preferred embodiment

| Relation | Data | Relation | Data |
|---|---|---|---|
| $V_2$-$V_1$ | 32.6 | $R_6/f$ | 0.29 |
| $v_2$-$v_1$-$v_3$ | 8.8 | $f/f_1$ | −0.30 |
| $T_{12}/CT_2$ | 0.52 | $f/f_2$ | 1.72 |
| $(CT_1 + CT_3)/CT_2$ | 0.65 | $S_D/T_D$ | 0.70 |
| $R_4/f$ | −0.33 | | |

According to the optical data as shown in Table 13 and the series of aberration curves as shown in FIG. 5B, the optical lens assembly for image pickup in accordance with this preferred embodiment of the present invention provides good correction results in aspects of the longitudinal spherical aberration, astigmatic field curving, and distortion.

In the optical lens assembly for image pickup of the present invention, the lens element can be made of glass or plastic. For the lens elements made of glass, the allocation of refractive power of the optical lens assembly for imaging pickup can have higher degree of freedom in selecting design parameters. For the lens elements made of plastic, the production cost can be lowered effectively.

In the optical lens assembly for image pickup of the present invention, if the lens element has a convex surface, then the surface of the lens element is convex at a position in proximity to the axis; and if the lens element has a concave surface, then the surface of the lens element is concave at a position in proximity to the axis.

In the optical lens assembly for image pickup of the present invention, at least one stop such as a glare stop or a field stop can be provided for reducing stray lights to improve the image quality, to limit the field size, or other functionalities.

Tables 1 to 15 show changes of values of an optical lens assembly for image pickup in accordance with different preferred embodiments of the present invention respectively, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical lens assembly for image pickup, sequentially arranged from an object side to an image side, comprising:
   a first lens element with negative refractive power, having a convex object-side surface and a concave image-side surface;
   a second lens element with positive refractive power, having a convex object-side surface and a convex image-side surface; and
   a third lens element with negative refractive power, having a convex object-side surface and a concave image-side surface, made of plastic, and at least one of the object-side surface and the image-side surface being aspheric;
   wherein there are three lens elements with refractive power in the optical lens assembly for image pickup; the optical lens assembly for image pickup further comprises a stop; $R_3$ is a curvature radius of the object-side surface of the second lens element, $R_5$ is a curvature radius of the object-side surface of the third lens element, $S_D$ is an axial distance between the stop and the image-side surface of the third lens element, $T_D$ is an axial distance between the object-side surface of the first lens element and the image-side surface of the third lens element, $T_{12}$ is an axial distance between the first lens element and the second lens element, $CT_2$ is a central thickness of the second lens element $R_6$ is a curvature radius of the image-side surface of the third lens element, f is a focal length of the optical lens assembly for image pickup, and the following relations are satisfied:

$0<R_5<R_3;$ $0.5<S_D/T_D<0.85;$ $0.15<T_{12}/CT_2<0.8;$ and $0<R_6/f<0.5.$

2. The optical lens assembly for image pickup of claim 1, wherein f is a focal length of the optical lens assembly for image pickup, $f_1$ is a focal length of the first lens element, and the following relation is satisfied:

$-1.2<f/f_1<-0.3.$

3. The optical lens assembly for image pickup of claim 1, wherein $CT_1$ is a central thickness of the first lens element, $CT_2$ is a central thickness of the second lens element, $CT_3$ is a central thickness of the third lens element, and the following relation is satisfied:

$0.3<(CT_1+CT_3)/CT_2<0.78.$

4. The optical lens assembly for image pickup of claim 1, wherein $R_4$ is a curvature radius of the image-side surface of the second lens element, f is a focal length of the optical lens assembly for image pickup, and the following relation is satisfied:

$-0.7<R_4/f<0.$

5. The optical lens assembly for image pickup of claim 4, wherein $R_4$ is the curvature radius of the image-side surface of the second lens element, f is the focal length of the optical lens assembly for image pickup, and the following relation is satisfied:

$-0.4<R_4/f<0.$

6. The optical lens assembly for image pickup of claim 1, wherein the first lens element and the second lens element are made of plastic, at least one of the object-side surface and the image-side surface of the first lens element is aspheric, and at least one of the object-side surface and the image-side surface of the second lens element is aspheric.

7. The optical lens assembly for image pickup of claim 1, wherein $v_1$ is an Abbe number of the first lens element, $v_2$ is an Abbe number of the second lens element, and the following relation is satisfied:

$25<v_2-v_1<42.$

8. The optical lens assembly for image pickup of claim 7, wherein $v_1$ is the Abbe number of the first lens element, $v_2$ is the Abbe number of the second lens element, $v_3$ is an Abbe number of the third lens element, and the following relation is satisfied:

$-10<v_2-v_1-v_3<20.$

9. The optical lens assembly for image pickup of claim 1, wherein HFOV is a half of maximum view angle of the optical lens assembly for image pickup (in degrees), and the following relation is satisfied:

$25<HFOV<38.$

10. An optical lens assembly for image pickup, sequentially arranged from an object side to an image side, comprising:
    a first lens element with negative refractive power, having a convex object-side surface and a concave image-side surface;
    a second lens element with positive refractive power, having a convex object-side surface and a convex image-side surface; and
    a third lens element with negative refractive power, made of plastic, having a convex object-side surface and a concave image-side surface, and at least one of the object-side surface and the image-side surface being aspheric;
    wherein there are three lens elements with refractive power in the optical lens assembly for image pickup; $R_3$ is a curvature radius of the object-side surface of the second lens element, $R_4$ is a curvature radius of the image-side surface of the second lens element, $R_5$ is a curvature radius of the object-side surface of the third lens element, f is a focal length of the optical lens assembly for image pickup, $v_1$ is an Abbe number of the first lens element, $v_2$ is an Abbe number of the second lens element, and the following relations are satisfied:

$0<R_5<R_3;$ $-0.7<R_4/f<0;$ and $25<v_2-v_1<42.$

11. The optical lens assembly for image pickup of claim 10, wherein $T_{12}$ is an axial distance between the first lens element and the second lens element, $CT_2$ is a central thickness of the second lens element, and the following relation is satisfied:

$0.15<T_{12}/CT_2<0.8.$

12. The optical lens assembly for image pickup of claim 11, wherein f is the focal length of the optical lens assembly for image pickup, $f_2$ is a focal length of the second lens element, and the following relation is satisfied:

$1.4<f/f_2<2.2.$

13. The optical lens assembly for image pickup of claim 12, wherein $R_6$ is a curvature radius of the image-side surface of the third lens element, f is the focal length of the optical lens assembly for image pickup, and the following relation is satisfied:

$0<R_6/f<0.5$.

14. The optical lens assembly for image pickup of claim 11, wherein $CT_1$ is a central thickness of the first lens element, $CT_2$ is the central thickness of the second lens element, $CT_3$ is a central thickness of the third lens element, and the following relation is satisfied:

$0.4<(CT_1+CT_3)/CT_2<0.78$.

15. The optical lens assembly for image pickup of claim 11, wherein HFOV is a half of maximum view angle of the optical lens assembly for image pickup (in degrees), and the following relation is satisfied:

$25<HFOV<38$.

16. An optical lens assembly for image pickup, sequentially arranged from an object side to an image side, comprising:
- a first lens element with negative refractive power, having a convex object-side surface and a concave image-side surface;
- a second lens element with positive refractive power, made of plastic, having a convex object-side surface and a convex image-side surface, and at least one of the object-side surface and the image-side surface being aspheric; and
- a third lens element with negative refractive power, made of plastic, having a convex object-side surface and a concave image-side surface, and at least one of the object-side surface and the image-side surface being aspheric;
- wherein there are three lens elements with refractive power in the optical lens assembly for image pickup; $T_{12}$ is an axial distance between the first lens element and the second lens element, $CT_1$ is a central thickness of the first lens element, $CT_2$ is a central thickness of the second lens element, $CT_3$ is a central thickness of the third lens element, $R_6$ is a curvature radius of the image-side surface of the third lens element, f is a focal length of the optical lens assembly for image pickup, and the following relations are satisfied:

$0.15<T_{12}/CT_2<0.8$;

$0.3<(CT_1+CT_3)/CT_2<0.78$; and $0<R_6/f<0.5$.

17. The optical lens assembly for image pickup of claim 16, wherein $R_3$ is a curvature radius of the object-side surface of the second lens element, $R_5$ is a curvature radius of the object-side surface of the third lens element, and the following relation is satisfied:

$0<R_5<R_3$.

18. The optical lens assembly for image pickup of claim 16, wherein $R_4$ is a curvature radius of the image-side surface of the second lens element, f is a focal length of the optical lens assembly for image pickup, and the following relation is satisfied:

$-0.7<R_4/f<0$.

19. The optical lens assembly for image pickup of claim 16, wherein $v_1$ is an Abbe number of the first lens element, $v_2$ is an Abbe number of the second lens element, and the following relation is satisfied:

$25<v_2-v_1<42$.

* * * * *